(12) United States Patent
Abrahams et al.

(10) Patent No.: US 7,319,971 B2
(45) Date of Patent: Jan. 15, 2008

(54) SYSTEM FOR MANAGING RISK

(75) Inventors: Ian E. Abrahams, Sydney NSW (AU); Radu C. Carlan, Sydney NSW (AU)

(73) Assignee: Corprofit Systems Pty Ltd, Sydney (AU)

( * ) Notice: Subject to any disclaimer, the term of this patent is extended or adjusted under 35 U.S.C. 154(b) by 874 days.

(21) Appl. No.: 09/774,538

(22) Filed: Jan. 31, 2001

(65) Prior Publication Data
US 2005/0086090 A1    Apr. 21, 2005

(51) Int. Cl.
*G06F 17/50* (2006.01)
(52) U.S. Cl. .............................................. 705/7
(58) Field of Classification Search .................. 705/7
See application file for complete search history.

(56) References Cited

U.S. PATENT DOCUMENTS

| | | | | |
|---|---|---|---|---|
| 5,594,637 A | * | 1/1997 | Eisenberg et al. | 705/2 |
| 5,930,762 A | * | 7/1999 | Masch | 705/7 |
| 5,950,175 A | * | 9/1999 | Austin | 705/35 |
| 5,978,784 A | * | 11/1999 | Fagg et al. | 706/45 |
| 6,567,814 B1 | * | 5/2003 | Bankier et al. | 707/101 |

FOREIGN PATENT DOCUMENTS

| | | |
|---|---|---|
| AU | 59440/98 | 9/1998 |
| FR | 2752472 | 2/1998 |
| WO | WO 94/27490 | 12/1994 |
| WO | WO 200054186 A1 * | 9/2000 |

OTHER PUBLICATIONS

Mulholland, Risk assessment in construction schedules, Jan./Feb. 1999, Journal of Construction Engineering and Management, v. 125, n. 1, p. 8-15 [EBSCO HOST search].*

(Continued)

*Primary Examiner*—Tariq R. Rafiz
*Assistant Examiner*—Peter Choi
(74) *Attorney, Agent, or Firm*—Ware, Fressola, Vandersluys & Adolphson LLP

(57) ABSTRACT

A system for providing an analysis of use in managing risk, the system including: a knowledge base, for maintaining generic risk records each including a plurality of different fields; a data store of profiles, for maintaining profile risk records associated with a particular profile, each profile risk record including the same plurality of fields as a generic risk record; and a risk processor, for updating generic risk records based on profile risk records in the data store of profiles. The knowledge base includes generic risk records with field values that can be refined over time so as to be useful in providing a more accurate risk assessment in any particular profile. Some of the risk record fields are measuring fields input by the user, and some are calculated fields calculated by the system, and the system allows different modes of analysis in which the fields that are the measuring fields differ. Also, in some applications, the system can be used in different modes of use, and only some fields, depending on the mode of use, are required. In some such applications, in one mode of use for example, an inherent risk impact cost is aggregated over an inherent cost of each consequence of the risk. A scripting facility is also sometimes provided for enabling a user to create a script directing how a risk management process is to be performed, the script indicating steps that can be used in performing risk analysis in any profile.

16 Claims, 11 Drawing Sheets

OTHER PUBLICATIONS

Parris, Risk assessment—defining the process, Dec. 1987, Risk Management, v. 34, n. 12, p. 40-48 [ABI/INFORM Global via PROQUEST search].*
Hall, Acceptable risk: a need for periodic review, Aug. 2000, Natural Hazards Review, v. 1, n. 3, p. 180-187 [EBSCO HOST search].*
White, How computers work millennium edition, 1999, Que Corporation, p. 77-83 (9 pages).*
initialize, Academic Press Dictionary of Science and Technology (1992). Retrieved Jun. 23, 2005, from xreferplus. http://www.xreferplus.com/entry/3117700.*
knowledge base, Academic Press Dictionary of Science and Technology (1992). Retrieved Jun. 23, 2005, from xreferplus. http://www.xreferplus.com/entry/3121314.*

* cited by examiner

SYSTEM FOR MANAGING RISK

FIELD OF THE INVENTION

The present invention relates to software applications based on decision theory, and more particularly to software applications directed to evaluating risk of an outcome in one or another context, an outcome which may be either adverse or favorable, and to helping plan so as to reduce adverse risk and to increase the likelihood of a favorable outcome.

BACKGROUND OF THE INVENTION

In planning a project, such as in building a house according to a contract that includes as a provision that the house be built by a date certain, or in simply planning activities or setting goals in one or another context, such as in setting financial goals, it is advantageous to identify risk and, depending on the risk, to develop contingency plans or take preventive steps so as to reduce the overall risk of an adverse outcome. The term risk is used here to mean the probability of an adverse outcome. Associated with the adverse outcome is an effect that can often be equated to some amount of money, i.e. can be measured in for example dollars. The product of the risk and the effect (or amount at risk) is here called the expected adverse outcome.

In some contexts, such as in the context of a large construction project, accounting for risk in any meaningful way is a complex undertaking. Risk must be identified, evaluated as to likelihood (to the extent possible), and then quantified (i.e. the corresponding adverse outcome for each particular risk must be expressed in some yardstick, such as dollars). Then the cost of corrective or preventive actions must be compared with the expected adverse outcome. Further, in many situations, the ultimate adverse outcome occurs only if several different events occur, further complicating the problem of how to address risk. Finally, the assignment of a likelihood of an adverse outcome, which is crucial to a correct accounting for risk, is often difficult, and depends more on experience than logic.

Thus, what is needed is an automated system for identifying and managing risk, a system that makes feasible the identification and evaluation of the risk of adverse outcomes in complex situations, and that allows taking into account in a dynamical way experience useful in estimating the likelihood of occurrence of different adverse outcomes.

SUMMARY OF THE INVENTION

Accordingly, the present invention provides a system for providing an analysis of use in managing risk, the system including: a knowledge base, for maintaining generic risk records, a generic risk record including a plurality of different fields; a data store of profiles, for maintaining profile risk records associated with a particular profile, a profile risk record including the same plurality of fields as a generic risk record, the profile risk records for use in providing a risk assessment in the associated profile; and a risk processor, for updating generic risk records based on profile risk records in the data store of profiles. The knowledge base includes generic risk records with field values that can be refined over time so as to be useful in providing a more accurate risk assessment in any particular profile.

In a further aspect of the invention, some of the risk record fields are measuring fields input by the user, and some are calculated fields calculated by the system, and the system allows different modes of analysis in which the fields that are the measuring fields differ. In a still further aspect of the invention, the modes of analysis include: a) a residual assessment mode, in which a user selects inherent values of likelihood and consequence for a risk, and a value, for each control for the risk, for effectiveness in either preventing the risk or reducing the consequence of the risk, and the system then calculates residual levels of likelihood, consequence and risk rating for the risk; b) an inherent assessment mode, in which a user selects residual values of likelihood and consequence for a risk, and a value, for each control for the risk, for effectiveness in either preventing the risk or in reducing the consequence of the risk, and the system then calculates the inherent levels of likelihood, consequence and risk rating for the risk; and c) a controls self-assessment mode, in which a user selects inherent values of likelihood and consequence for a risk, as well as residual values of likelihood and consequence for the risk, and the system then calculates the effectiveness of predetermined controls needed to either prevent the risk or to reduce the consequence of the risk.

In another, further aspect of the invention, the system can be used in different modes of use, and only some fields are required to be used in the risk management analysis, the fields that are required depending on the mode of use. In a still further aspect of the invention, both a generic risk record and a profile risk record include: a) a risk component, for indicating a risk, for indicating an inherent risk rating, and also for indicating a residual risk rating; b) a cause component, for indicating the cause of the risk; c) a consequence component, for indicating a particular consequence of the risk and the inherent and residual cost of the particular consequence; and d) a control component, for indicating a control, for indicating whether the control is corrective or preventive, and for indicating the effectiveness of the control. In some such applications, in one mode of use, the inherent risk impact cost is aggregated over the inherent cost of each consequence of the risk, and in other such applications, in one mode of use, the residual likelihood is an aggregate calculation based on the effectiveness of each preventive control acting on the inherent likelihood, and yet still other such applications, in one mode of use, the residual risk impact cost is aggregated over the residual cost of each consequence of the risk.

In yet another, further aspect of the invention, a scripting facility is provided for enabling a user to create a script directing how a risk management process is to be performed, the script indicating steps that can be used in performing risk analysis in any profile.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Terminology

Figure 1A:
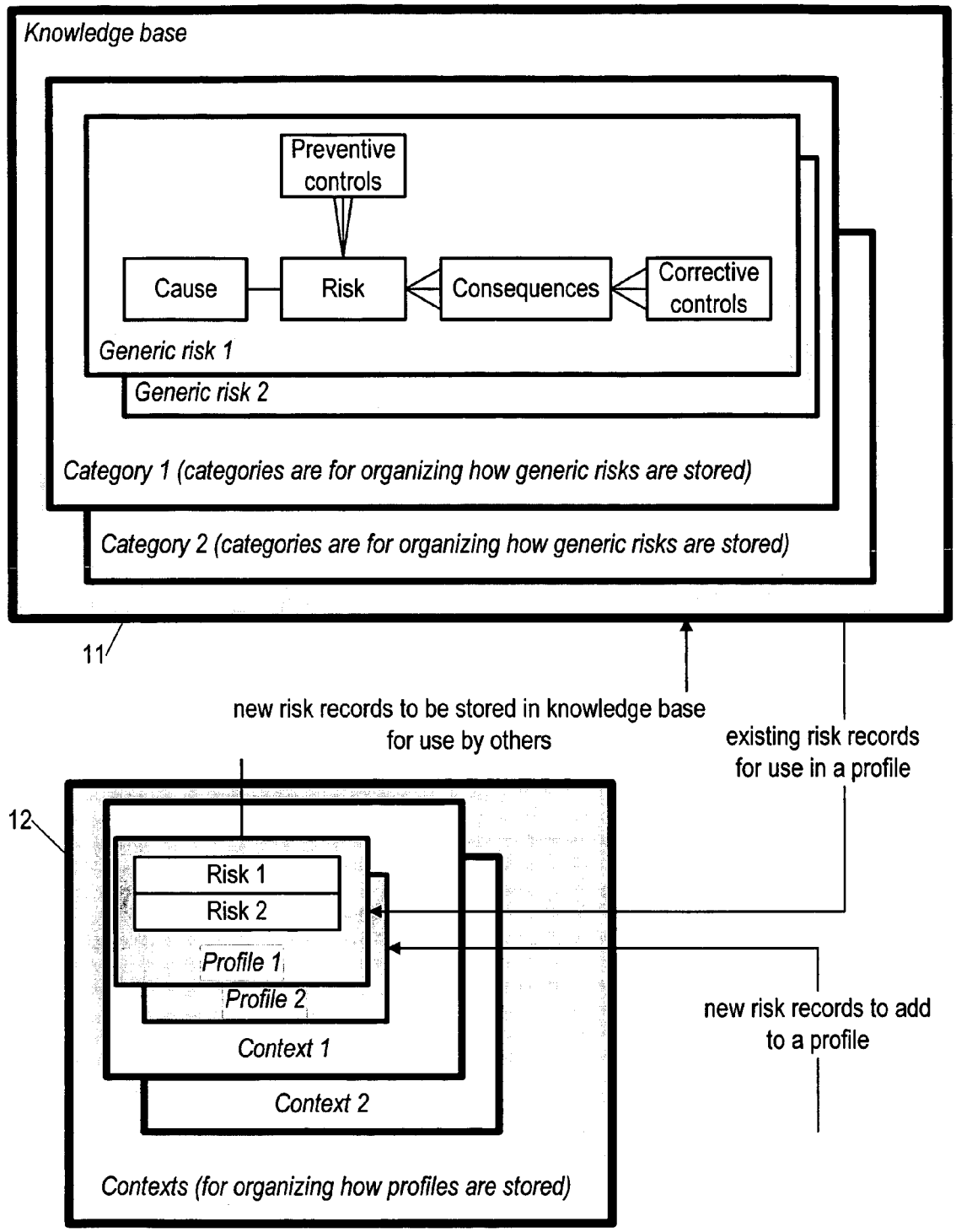
FIG. 1A is a block diagram/flow diagram of a system for managing risk according to the present invention, including a knowledge base (of generic risk records) and a data store of contexts (each context including risk records specific to the context)

To help in understanding a description of how to make and use the invention, it is useful to provide precise definitions of the principal terms used in the description. The invention centers about data store records associated with different risks. Each such record includes a risk (field), a cause, a consequence, and a control. The invention has to do with taking into account risks to the outcome of a process. The term risk is used here (as a field in a record of the data store) to indicate the chance of occurrence of an identified event having an effect on the outcome of a process or goal. For example, the chance of occurrence of an event affecting the outcome of a project or affecting the likelihood of achieving a goal would be referred to as a risk as the term is used here. In common parlance, the term risk is associated with an adverse outcome, but in the description below, the term risk indicates an event that affects the outcome of a process either favorably or adversely. In brief, risks, as used here, indicate events that matter. To aid in understanding the invention, a particular application of the invention, that of a foreman of a roadworks crew tasked with managing the crew build a particular stretch of road, will be used throughout the description as an illustration of how the invention works. In such an application of the invention, assuming for illustration that the road is to be built according to a set of requirements that calls for a particular grade of macadam, an example of a risk is (the chance or possibility) that the road will be built with an inferior grade of macadam.

The term cause is used to indicate the reason a risk occurs. Although there can be more than one cause of a risked event, a cause as used here taken to be unique to a particular risk, i.e. there is a one-to-one relationship between a risk and its cause. In case of different possible causes for the same risked event, a user of the invention would provide a separate risk record (including a risk, cause, consequence, and control) for each cause. Because a cause as used here is unique to a risk (and vice versa), a cause is regarded in the invention as an attribute of a risk, and in the preferred practice of the invention, the (direct) cause of a risk is embedded in the description of the risk. In such practice, the cause of the risk is then taken to be not the direct cause of the risked event, but instead the failure or absence of a safeguard protecting against the direct cause of the risk. Thus, a user might enter as a risk that the road is built with an inferior grade of macadam and enter as the associated cause that the foreman fails to properly inspect the materials. However, in the preferred way of using the invention, the user would enter as the risk that the road is built with an inferior grade of macadam because the foreman failed to properly inspect the materials, and would enter that the cause is the absence of a materials inspection component of the quality control for the project. Of course such a cause could give rise to other risked events, so that the focus of the analysis in the preferred embodiment is not risks having many possible causes, but causes having many possible risked events. Thus, the cause that is entered, in the preferred embodiment, is a root cause of possibly many different risked events, and serves as a more logical starting point for a comprehensive risk analysis.

The term consequence indicates a particular impact of a particular risk. In general, there are various consequences associated with any given risk. Thus, risks and consequences stand in a one-to-many relationship. An example of a consequence in the roadworks illustration is that the company will have to pay out of the contract price damages amounting to some specified amount, compensating the contracting entity for the use of the inferior grade macadam, i.e. a user would indicate the consequence as a particular amount of money.

The term control indicates specific actions to be taken in order to either reduce a particular risk or mitigate the consequences associated with a particular risk. The former controls are here called preventive controls, and the latter are called corrective controls. An example of a preventive control for the roadworks risk that the road is built with inferior macadam is to schedule periodic telephone calls to the supplier to confirm the grade that is to be supplied. An example of a mitigating risk is to arrange that the road be finally inspected in stages so as to catch improper materials before the entire road is completed with an inferior material. Obviously, preventive controls are usually effective against a variety of different risks and corrective controls are usually effective against a variety of different consequences. In addition, each risk can have several preventive controls, and each consequence of each risk can have in turn several corrective (mitigating) controls.

The invention is an automated system for managing risk. The system groups together, in what is called a profile, all risks connected with a given process/project. In creating a profile, a user of the system can identify risks and enter them into a profile, or can identify risks as being risks already included in a knowledge base maintained by the system and not associated with any particular profile, i.e. so called generic risks, or risks that can be derived from such generic risks.

Each such addition to a profile, i.e. each new risk record added to a profile, includes a risk, its cause, a consequence, and a control. For risks having several consequences or controls, a risk record is added to the profile for each different consequence and control combination.

For ease of use, the system includes standard so called contexts, i.e. pre-named folders in which profiles may be stored. (The system also allows a user to create new contexts.) In the roadworks example, the line manager will create a profile, consisting of all the risks and associated causes, consequences, and controls, will give it a reference label and suggestive title such as roadworks, and will store it in one of the standard context folders. One such standard context, and one that would be appropriate for the roadworks profile, is the work context. If the particular project to be managed by the line manager is merely one task in a larger project, the line manager would likely create a subcontext of the context folder (or some other manager would do so), a subcontext indicating the full project, and the line manager would store the profile in such a subcontext folder.

Data Structures

Referring now to FIG. 1A, the different data items used as part of the invention are shown as including two data stores: a knowledge base 11 of generic risk records (risk records not associated with any particular profile or context) organized by category, and a contexts data store 12, each context serving as a folder (sub-data-store) of a set of logically related profiles, each profile in turn serving as a folder of a set of (non-generic) risk records. FIG. 1A shows that a risk record (actually a collection of table entries in the preferred embodiment of a relational database implementation, as described below in connection with FIG. 1D), includes four main components: a risk component, a cause component, one or more consequence components, and one or more control components, each of which is either a preventive control or a corrective control.

Figure 1B:
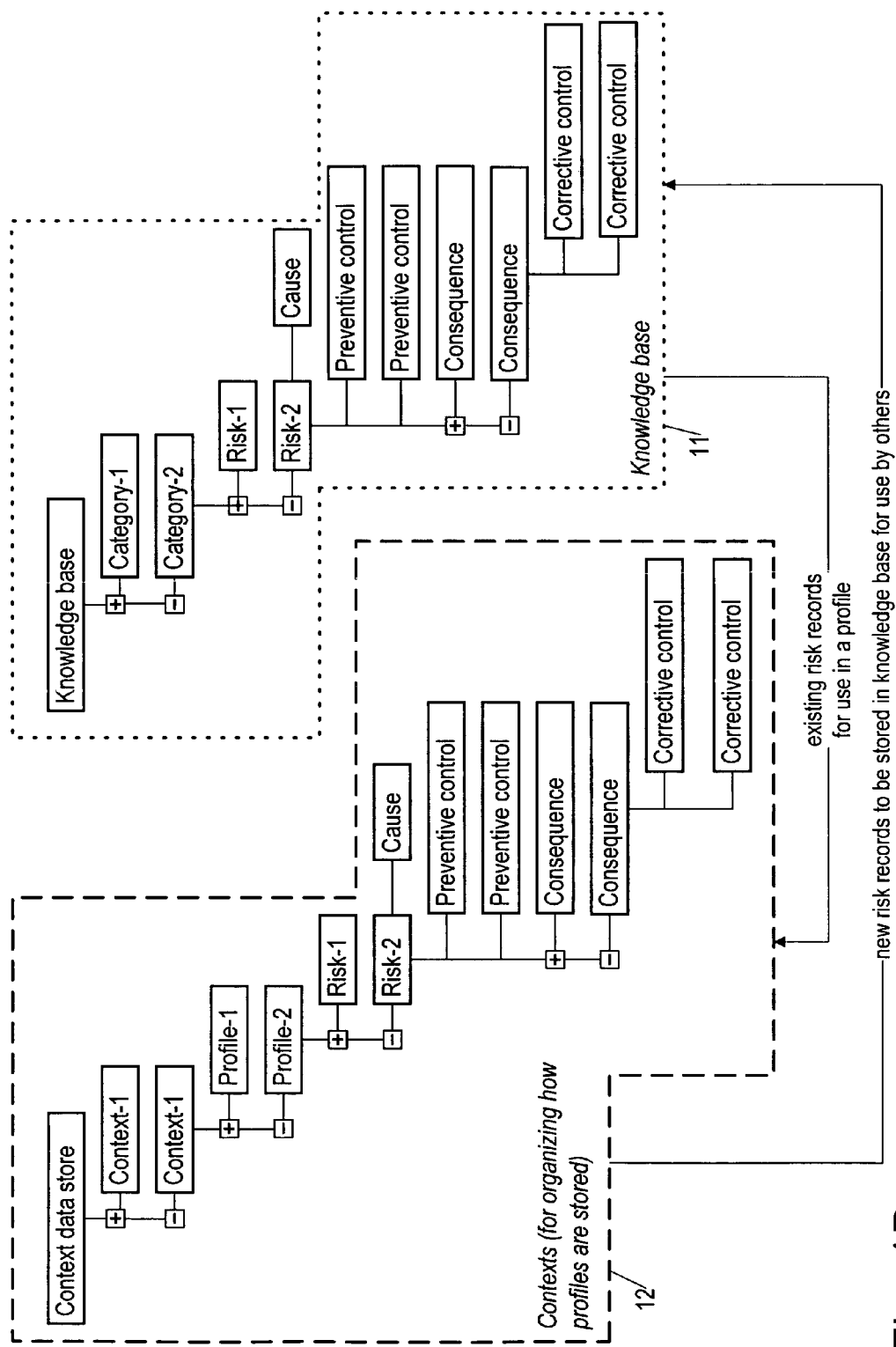
FIG. 1B is a data structure diagram, showing how data is organized in the knowledge base and in the data store of contexts.

Referring now to FIG. 1B, the knowledge base 11 and the context data store 12 are shown in a tree structure representation. A plus sign placed to the left of a block is used to indicate that the block includes contents that are not shown in the view, i.e. in the terminology used in a graphical user interface tree structure representation of the content of a disk drive, such as provided by the WINDOWS EXPLORER file manager application available as part of the WINDOWS operating systems provided by Microsoft Corporation, the block is not fully expanded. A minus sign to the left of a block indicates that a block is fully expanded, i.e. that its full content to the next level in the tree structure is shown. Thus, referring in particular to FIG. 1B, a context folder is shown containing two profiles, one of which is expanded to show that it contains two risks. One of the risks is in turn expanded to show that it contains two preventive controls, two consequences, and one cause. Finally, one of the consequences is expanded to show that it contains two corrective controls.

Figure 1C:
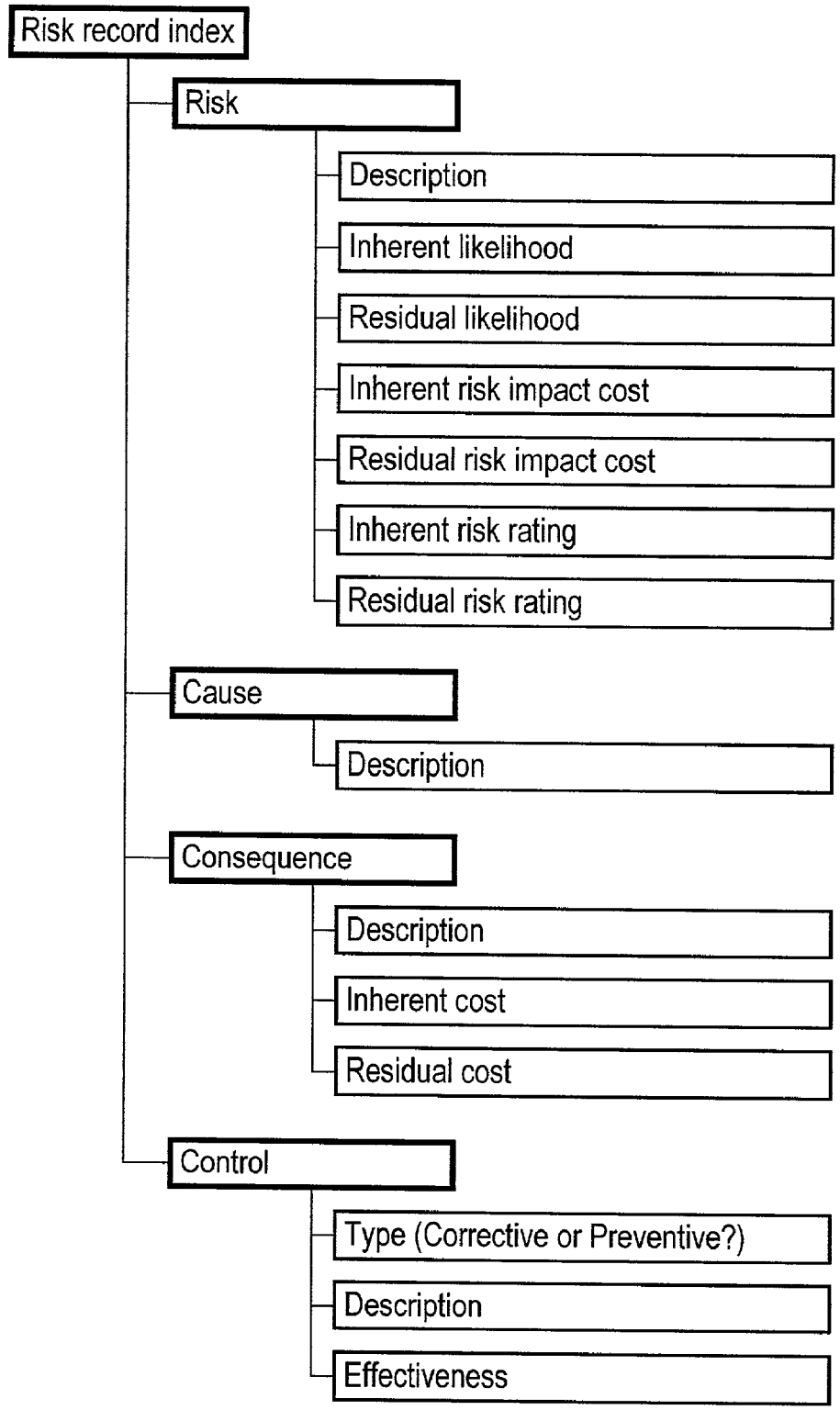
FIG. 1C is a data structure diagram for a risk record, which includes four components: risk, cause, consequence, and control.

Referring now to FIG. 1C, a risk record is shown in more detail as including a risk record index for locating a particular risk record, and the four components already mentioned, namely, the risk, cause, consequence, and (either corrective or preventive) control components. Each of the components includes two or more fields, some of which are simply descriptions, and the others of which have values. When a field value (as opposed to a description) is provided by a user or extracted from the knowledge base, instead of being calculated, the field is called a measuring field; otherwise it is a calculated field. In general, as explained below, depending on the mode of analysis, fields having values (as opposed to being descriptions) can be either measuring fields or calculated fields, depending on the mode of analysis.

The risk component includes seven fields. A description field serves to identify the risk to a user. An inherent likelihood field, on the other hand, has a value, one that provides either a subjective (explained below) or a quantitative measure of the likelihood of occurrence of the risked event. The value of a field, such as the inherent likelihood field, can be either what is here called a subjective value (such as, in the case of the inherent likelihood, the values likely or either unlikely or rare), or can be what is here called a quantitative value, i.e. a specific numerical value. Whether a measuring field value is subjective or quantitative, the invention nevertheless can perform an actual calculation (of perhaps another, calculated field value) involving the measuring field value. For example, the invention in one mode of analysis calculates what is here called residual risk impact cost, accounting for the inherent likelihood, the possible consequences, and any controls that have been applied. In general, where the user has decided to use quantitative judgements, the numerical values input by the user are used in the calculation, and where the user has decided to use subjective judgements, the system will perform the calculations by associating with each subjective label/value a range of numerical values and using the midpoint of each range in performing the calculations. In case of a subjective calculation, after performing the calculation, so as to display the result in subjective terms, the invention converts the output to a subjective label/value using pre-determined numerical ranges for calculated fields. The invention synchronizes (or in other words associates) the subjective field values (which are word labels) with corresponding typical numerical values and a range of numerical values about each typical value, thus providing the user the opportunity to switch at any time between a subjective analysis and a quantitative analysis; by switching from a subjective analysis to a quantitative analysis (and back and forth again and again as is helpful), a user can begin with a rough subjective analysis and ultimately provide a more accurate, final analysis. For the inherent likelihood field, the value (which can be either a subjective value or a quantitative value) can be provided either by the knowledge base (at the option of the user) or by the user, or it can be calculated by the invention, depending on the mode of analysis, as explained below.

The associating (or synchronizing) of the subjective field values (labels) with corresponding numerical values (and ranges) is based on having for the different measuring fields, synchronizing tables of subjective values along with associated typical values and ranges, such as for any of the likelihood fields. The synchronizing table for any of the likelihood fields (such as for example the inherent likelihood field) is shown as table 1.

TABLE 1

Synchronizing table of subjective values for likelihood.

| Level (subjective value) | Typical value | Minimum | Maximum |
| --- | --- | --- | --- |
| Rare | 10% | 0% | 20% |
| Unlikely | 30% | 20% | 40% |
| Possible | 50% | 40% | 60% |
| Likely | 70% | 60% | 80% |
| Almost certain | 90% | 80% | 100% |

According to the invention, a user is free to add more levels or eliminate some of the default levels. If a user were to decide to use a particular subjective value for likelihood, say the value/level likely, the typical value indicated in the table (which can be modified by the user) would be used in actually performing the subjective calculation, through the synchronization automatically performed by the invention. If instead the user were to decide to use a quantitative value for likelihood, say 63%, but also to indicate that the results be expressed in subjective values, then since 63% is in the range associated with the subjective value likely, the invention would display the value/level likely. Thus, even though the subjective field values/levels may be the same in two different calculations, the actual underlying numerical values being used may be different.

As another example, Table 2 shows the synchronization table for the consequence field.

TABLE 2

Synchronization table of subjective values for consequence.

| Level (subjective value) | Typical value | Minimum | Maximum |
|---|---|---|---|
| Insignificant | $50 | $0 | $275 |
| Minor | $500 | $275 | $2,750 |
| Moderate | $5,000 | $2,750 | $27,500 |
| Major | $50,000 | $27,500 | $275,000 |
| Catastrophic | $500,000 | $275,000 | Infinite |

It is anticipated that after continued use of the invention, users will have added new subjective values (with corresponding typical values and ranges) and will also have adjusted the typical values and associated ranges for existing subjective values. The invention will refine the typical values and ranges based on an average of what everyone is using, so that the next time a user begins a project, the user begins with the new default values; existing values on profiles are not changed, however. Thus, if a user were to take a risk item from the knowledge base and add it to a profile, the values of the risk item would be based on the average values in the knowledge base.

In addition to a description field and an inherent likelihood field, the risk component also includes five other fields: an inherent risk impact cost, an inherent risk rating, a residual likelihood, a residual risk impact cost, and a residual risk rating. The inherent risk impact cost is a measure of the impact of the risked event, were it to occur. The inherent risk rating is essentially the product of the inherent likelihood and the inherent risk impact cost, and in the preferred embodiment is expressed according to the same measure as the inherent risk impact cost (e.g. US dollars).

In the use of the invention, different terminology is used for the same field, depending on whether the field values are expressed quantitatively or subjectively; in other words, every field has a subjective name and a corresponding quantitative name. The corresponding quantitative name for inherent likelihood is inherent probability. The corresponding quantitative name for inherent consequence is maximum foreseeable loss. The corresponding quantitative field for inherent rating (the product of inherent likelihood and inherent consequence) is inherent exposure. The description given here, however, uses the same name for the same field, whether the field values are expressed quantitatively or subjectively.

The residual likelihood field takes into account the effectiveness of any preventive controls in place for the risk, i.e. it is an aggregated value, based on all preventive controls. If there are no preventive controls, i.e. if the risk record includes only corrective controls or none at all, then the residual likelihood will equal the inherent likelihood. The residual risk impact cost field is an aggregated field also, and expresses the impact of the risked event reduced by all in-place corrective controls; it is the product of the inherent likelihood, the effectiveness of whatever corrective control is associated with a particular risk record, and the inherent cost of the risked event, aggregated over all corrective controls. Finally, the residual risk rating field is essentially the product of the residual likelihood and the residual risk impact cost. The (residual or inherent) risk rating (having a quantitative equivalent called here exposure, measured for example in dollars) thus provides a measure of the risk exposure (for the particular risk) and so is useful to the user as one of the means in prioritizing all of the risks of a profile so as to determine the order in which to address the various profile risks.

The cause component includes merely the description of the risk and serves as a refinement of the risk definition. It is, as mentioned above, preferably a root cause of the risk rather than an immediate cause, and so serves as a starting point for a comprehensive risk analysis.

The consequence component includes three fields: a description; an inherent cost field, which is the cost of the consequence of the risked event without taking into account any possible corrective or preventive control; and a residual cost field, which is the inherent cost multiplied by the effectiveness of whatever corrective control, if any, is included in the risk record. The residual cost is useful in viewing the various risks in a profile according to consequence, not according to risk, so that the likelihood of a risk is not a factor in prioritizing the allocation of resources. The residual cost (or retained cost) is the cost remaining after the work of any corrective control that may be in place (so that the effectiveness of a corrective control is selected (or calculated, depending on the mode of analysis) to be that value that multiplies the inherent cost to yield the residual cost). For example, in case of the risk to an owner of a building of the building burning down, the inherent consequence is the total replacement value of the building, while the residual consequence is only what the owner must pay to replace the building after receiving the proceeds from any insurance on the building.

The control component includes three fields: a type field, a description field, and an effectiveness field. The type field indicates whether the control is a corrective control or a preventive control. The description field defines the control for a user. The effectiveness field indicates, in either subjective or quantitative terms, the extent to which the control either eliminates the likelihood of a risk (in the case of a preventive control) or reduces the inherent cost of a consequence of the risk (in the case of a corrective control). Thus, when measured in quantitative terms, the effectiveness is typically a value somewhere in the range from zero to one, with values closer to one indicating greater effectiveness. In some embodiments, the control component also includes a cost of control field (not shown), for entering a value which is an estimate of the cost of the corresponding control in either subjective or quantitative terms.

As indicated above, in general, fields having either subjective or quantitative values can be either measuring fields or calculated fields, depending on the mode of analysis. There are three modes of analysis: residual assessment, inherent assessment, and controls self-assessment.

In the residual assessment mode, the user selects the inherent values of likelihood and consequence, and a value for the effectiveness of each control to either prevent the risk or to correct the consequence. The invention then calculates the residual levels of likelihood, consequence and risk rating.

In the inherent assessment mode, the user selects the residual values of likelihood and consequence, and a value for the effectiveness of each control to either prevent the risk or to correct the consequence. The invention then calculates the inherent levels of likelihood, consequence and risk rating.

In the controls self-assessment mode, the user selects the inherent values of likelihood and consequence, as well as the residual values of likelihood and consequence. The invention then calculates the effectiveness of the controls to prevent the risk or to correct the consequence. The controls self-assessment mode is useful for gauging what the level of effectiveness of preventive and corrective controls should be, so as not to over-control some risks and under-control others.

Figure 1D:
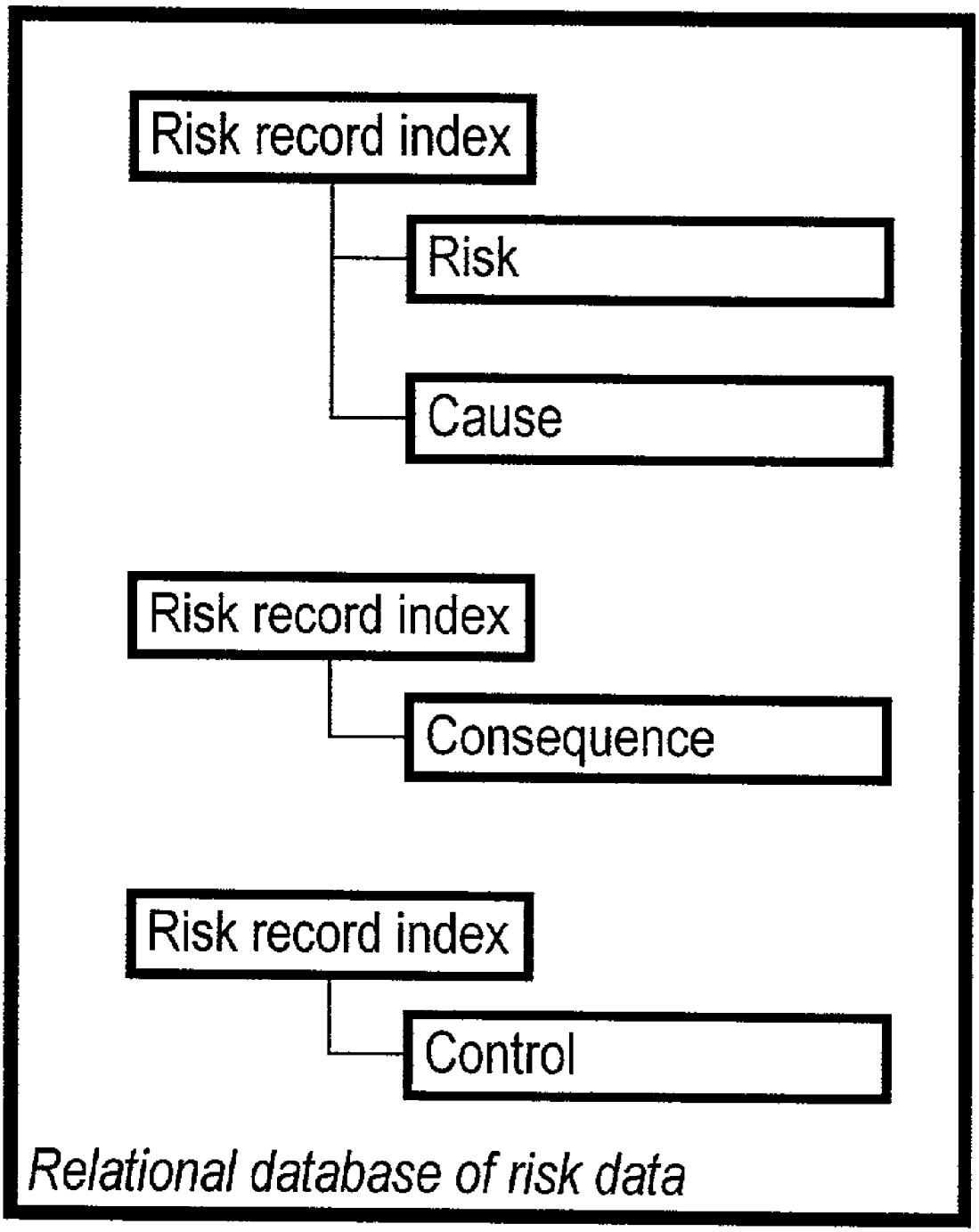
FIG. 1D is a top-level data structure diagram indicating the organization of data used in the invention in case of a relational database implementation.

Referring now to FIG. 1D, in the preferred embodiment the risk data are stored in a relational database, i.e. a set of tables with entries related through a key or index field. In such an embodiment, since risks can have more than one consequence and more than one control, there is one table that includes the risk component and the cause component as well as a key field, and there are separate tables for the consequence component and for the control component, each such table using a key field to relate table entries to a particular risk in the risk table. Thus, a particular risk and its cause occur only once in the data store that includes the three different tables.

Using the Invention

It is of course the aim of a user of a system according to the invention to create controls so as reduce the residual risks of a profile from unacceptable initial (inherent) risk rating values to acceptable residual risk values. In other words, the overall objective of a user in using the invention to manage risk is to determine how to allocate limited resources (of time, money, or staff) so as to most efficiently try to keep to a minimum the (total residual) risks to a process or project. Thus, a user wishes to determine how to allocate resources so as to minimize the statistical expectation of all consequences of all risks to an undertaking (process or project). The invention is therefore a sort of decision support tool, and as such does not provide a single output, but instead provides information of use in making a resource allocation decision. To this end, as described in more detail below, a user must identify risks, evaluate them as to likelihood (to the extent possible), and then quantify them (i.e. express in some yardstick, such as dollars, the corresponding adverse outcome for each particular risk).

Figure 2:
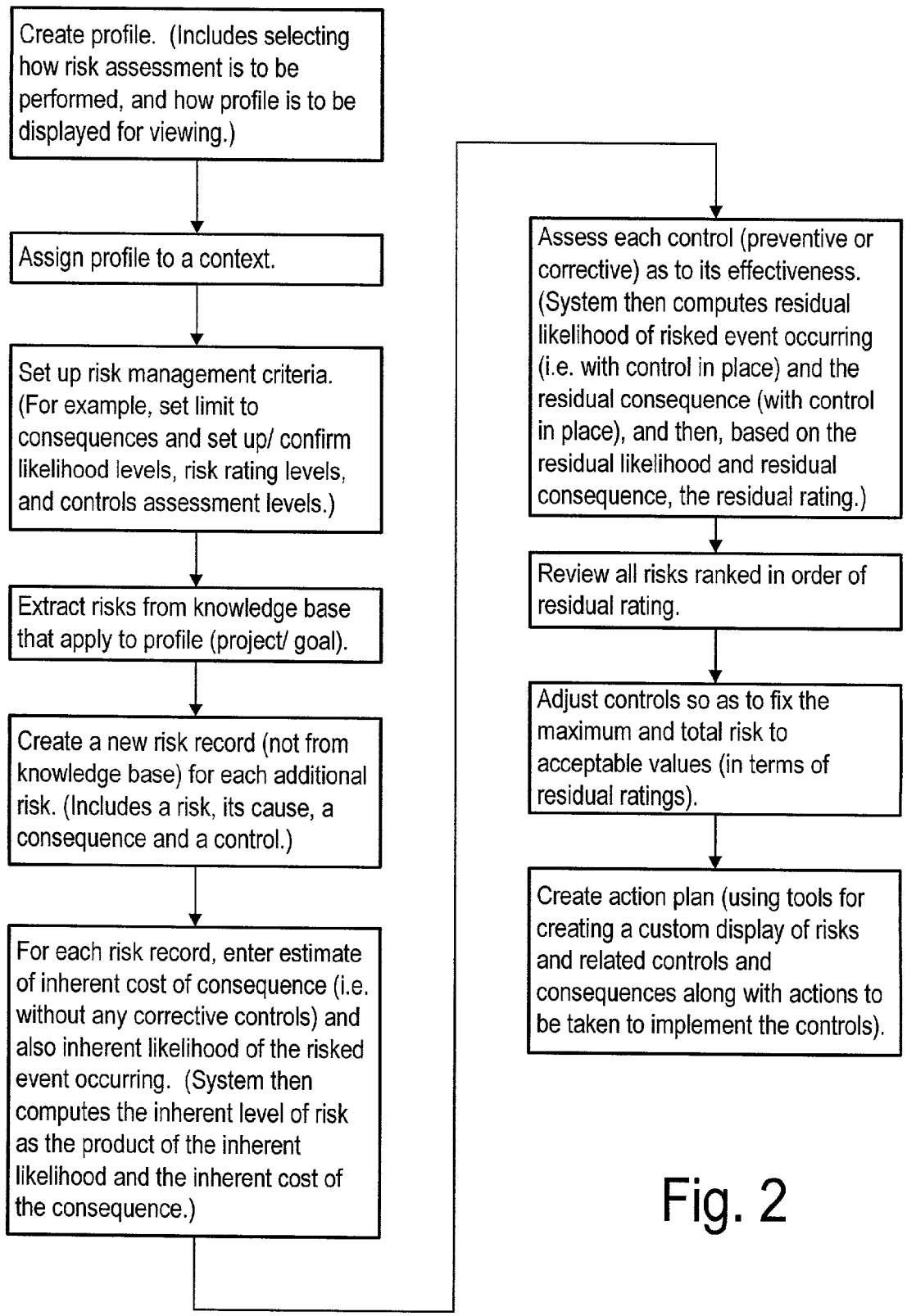
FIG. 2 is a flowchart indicating one way in which the invention is used.

Referring now to FIG. 2, a flow chart indicating use of the invention in a particular scenario is shown as beginning with the step of creating a profile. Such a step of creating a profile includes selecting how the risk assessment is to be performed by the automated risk management system and how a profile is to be displayed for viewing. A system according to the invention provides various filters to a user of the system to tailor the information the user receives from the system about the risk analysis being performed. As far as how the risk analysis is to be performed, in setting up the profile, the user indicates whether a subjective or quantitative analysis is to be performed. As explained above, a subjective analysis uses qualitative descriptors for measuring fields, and so to indicate the likelihood of a risk event occurring to indicate the consequence of a risk event occurring. For example, in a subjective analysis, the likelihood of a risk event occurring might be indicated as likely, and a consequence of the risked event occurring might be indicated as major. Each such qualitative descriptor has a range of numerical values associated with it. In the case of risk being described as likely, the numerical range might be 0.6-0.9, indicating that the probability of the event occurring lies somewhere in the range of from 0.6 to 0.9. The qualitative descriptor major for the consequence of a risk might have a numerical range associated with it of from $500,000 to $750,000. Thus, although the user of the system would indicate that the analysis is to be performed in a subjective mode, so that the user thinks only in terms of qualitative descriptors, the automated system nevertheless performs calculations using the typical (numerical) value for the subjective value/level, a value that can be set by default, or a value that the user sets independent of the default value, or a value that is calculated by the invention to be an average of all other typical values for the same subjective value for the same risk in all (or a selected subset of all) profiles in the database. (It is the typical value of each subjective level/value that becomes more accurate, in terms of accounting for more experience, as the knowledge base learns over time.) If the user elects to have the system perform the calculations in quantitative mode, the user can then enter specific numerical values for the likelihood of a risked event occurring and the consequence of the event occurring, as well as for the effectiveness of either a corrective control or a preventive control.

The next step in this particular use of the application is to assign the newly created profile to a particular context.

The context can be a preexisting context or a context that the user creates specifically for the newly created profile. The context is essentially nothing more than a folder for grouping profiles that are logically related.

In the next step, the user sets up the risk management criteria. Risk management criteria include a limit to the consequences of any risk in the profile, and also include numerical ranges for the qualitative values of the measuring fields, so as to create the association between numerical ranges and qualitative descriptors described above. Risk management criteria also include the risk rating levels. As explained above, a risk rating level is a calculated value, expressed either subjectively or quantitatively, and is a measure of the likelihood of occurrence combined with the extent of the consequence of the risked event. Thus, a risk having a high (i.e. likely) probability of occurrence but only a moderate consequence would have the same risk rating as a risk with an unlikely risked event that has, nevertheless, catastrophic consequences. There are three risk ratings: an inherent risk rating, a residual risk rating, both of which have already been mentioned, and also a predicted (risk) rating.

For an inherent risk rating, no controls are applied. Therefore, an inherent risk rating is a measure of a risk in the worst case scenarios of uncontrolled likelihood and consequence (i.e. a measure in case of no preventive or corrective controls). For a residual risk rating, preventive and corrective controls are applied, yielding residual likelihoods and residual consequences, respectively. For a predicted rating, control measures that are under consideration but not yet in place are taken into account. Until such controls are put in place, the residual risk rating is not affected by them. The predicted rating thus gives a target to be attained.

In the particular example of the use of the invention illustrated in FIG. 2, in the next step the user extracts risks (i.e. risk records including a risk, cause, consequence and control) from the knowledge base of generic risk records. In the preferred embodiment, as shown in FIGS. 1A and 1B, the knowledge base organizes risks according to categories to aid in a user locating existing risks that the user might want to include in a new risk profile. As will be explained in more detail below, the generic risks in the knowledge base have values for measuring fields (risk inherent likelihood, inherent cost of consequence and control effectiveness) that are averages of the values used in profiles of various users over time. A user can extract a risk from the knowledge base and either use these learned values or override the values with values of the user's own choosing. Typically only some of the risks appropriate to a new profile being created by a user will be extracted by the user from the knowledge base. The user will in addition create new risks from scratch, as in the next step in the particular use of the invention illustrated in FIG. 2.

For each risk record, if the user has not already done so, the user will enter values for the measuring fields for each risk (with the mode of analysis dictating which fields are the measuring fields). Thus the user might enter values for an estimate of the inherent cost of a consequence or confirm the inherent cost of the consequence (i.e. the cost without any corrective controls in place) if the risk record has been pulled from the knowledge base. In addition, the user might either enter values for the inherent likelihood of the risked event occurring (i.e., without taking into account any preventive controls) or accept the values in those records that have been pulled from the knowledge base. With values for the inherent cost of a consequence and values of the inherent likelihood of each risked event, the system will then compute the inherent risk rating as the product of the inherent likelihood and the inherent cost of a consequence, aggregating over all consequences if there are more than one.

Next the user assesses each control included in the profile as to its effectiveness, and for each risk record either enters a value of the user's own choosing or, if the risk record was extracted from the knowledge base, either agrees to the knowledge provided by the knowledge base or enters a different value. The system then computes values for the residual likelihood of each risked event (likelihood values that differ from the inherent likelihood values because of preventive controls) and also residual consequences for each risked event (values that differ from the inherent consequences because of corrective controls). Finally, the system calculates the residual rating for each risked event taking into account the control in place for each risk record. The user will then, at least in the scenario of FIG. 2, ask the system to provide a list of all the risks ranked in order of the now calculated residual rating. Then in a next step according to this scenario, the user will adjust the controls until the maximum residual risk and the total residual risk have acceptable values.

Figure 3:
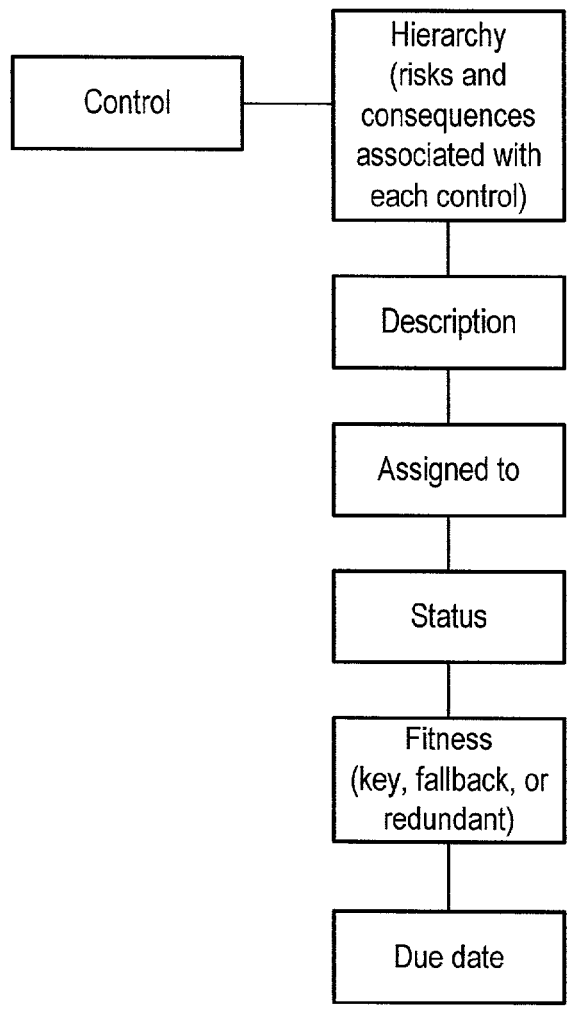
FIG. 3 is a data structure diagram for a control record (a component of a risk record)

Finally, once the maximum and total risk values are acceptable, the user will take advantage of a feature of this system that allows the creation of an action plan. Essentially, the tools that are provided by the system include fields by which to describe how controls will be implemented and who will be responsible for carrying into effect each control. Referring now to FIG. 3, fields provided by the system in the preferred embodiment for creating an action plan are shown as including for each control field an associated (read-only) hierarchy field, showing the risks and consequences associated with the control, a description field (already mentioned), an assigned to field, a status field for indicating the status of the effort to implement the control, a fitness field for indicating whether the control is a key control (i.e., a critical control), a fallback control or a redundant control, and a due date field for indicating the date by which the control is planned to be in place.

If a risk has more than one control, the system will in effect use the aggregated values of all the controls that are applied. The user can make a judgement as to the aggregated subjective value or, where more than one control exists, a judgement as to the aggregated quantitative value of the combination of controls. The user does this by viewing the controls and manually selecting an aggregated value of the preventive and corrective controls, the value here being thought of as aggregated up to the risk level, as explained below in connection with FIGS. 9A-9C. Alternatively, the invention lets the user set a switch that causes the value of effectiveness of each control to the set by the user and then aggregated to the risk level.

The aggregated calculations work as follows. First, the first control is applied, and the residual levels are derived corresponding to the first control. Then the next control is applied to those residual levels, the result being a new set of residual levels, and so on. Thus, the controls are applied incrementally, yielding incremental residual levels.

Such an aggregated calculation is widely used in the risk management industry and is not unique to the invention. What is unique to the invention, however, is that it allows a user to choose a mode of assessment (i.e. the residual assessment mode, inherent assessment mode, or the controls self-assessment mode described above) and to use either subjective or quantitative measures in performing the assessment analysis. Further, the user can elect to aggregate to the risk level the individual consequences or the effectiveness of each individual control (or both). Thus, the invention offers a mixture of use sophistication, as explained in more detail below. The ability to have the invention perform more sophisticated calculations, combined with the ability of the knowledge base to learn over time, makes possible highly accurate risk management calculations.

Figure 4:
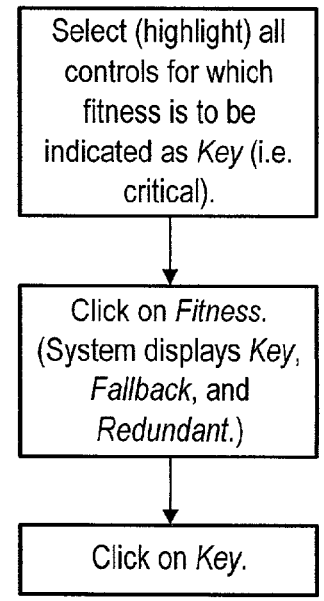
FIG. 4 is a flowchart indicating a particular capability of the invention (the capability for assigning values to several fields simultaneously)

In creating the action plan, the user will typically configure a view of some or all the controls of a profile. In the preferred embodiment of the invention as indicated in FIG. 4, with a list of all the controls of the profile, a user is able to assign a value to fitness for more than one control at a time by highlighting (selecting) each control that is to be assigned the same value for fitness (such as for example the value key, which is the value shown selected in FIG. 4) and then clicking on a tab indicating fitness so that a drop-down list appears, from which the particular value to be assigned to all of the selected controls is picked and ends up being attached to each selected control.

Figure 5:
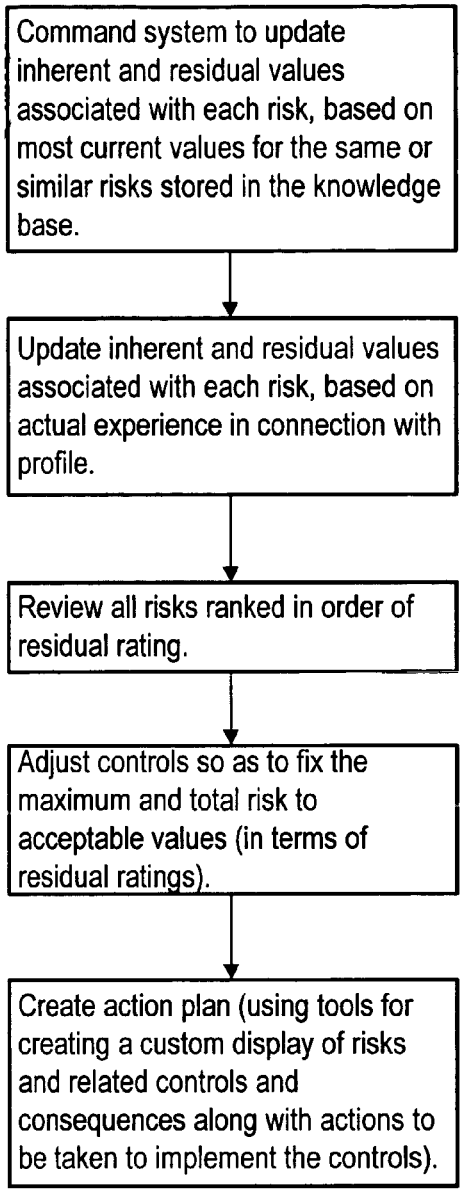
FIG. 5 is a flowchart indicating how, in assessing risk values in a particular context, a user of the invention is able to make use of risk values gained through experience in similar contexts and stored in the knowledge base.

Referring now to FIG. 5, a scenario is indicated in which a user updates the quantitative or subjective fields in the risk records of a profile based on values stored in the knowledge base. In this scenario, after updating the fields, the user reviews the values provided by the knowledge base and decides whether to override any of the values. The values provided by the knowledge base include values for each of the measuring fields: the inherent likelihood of a risk, the inherent cost of the consequence, and the effectiveness of a control. In a next step according to this scenario, the user reviews all risks ranked in order of residual rating. The user reviews the values for the measuring fields associated with each risk and then, in a next step in which the user adjusts controls so as to fix the maximum and total risk to acceptable values (in terms of residual ratings), the user accepts or overrides the values based on either actual experience of the user in connection with the profile, or based on other information or even simply based on an educated guess. The user then proceeds as in the previous scenario to create an action plan beginning with the step of reviewing all risks ranked in order of residual risk.

Figure 6:
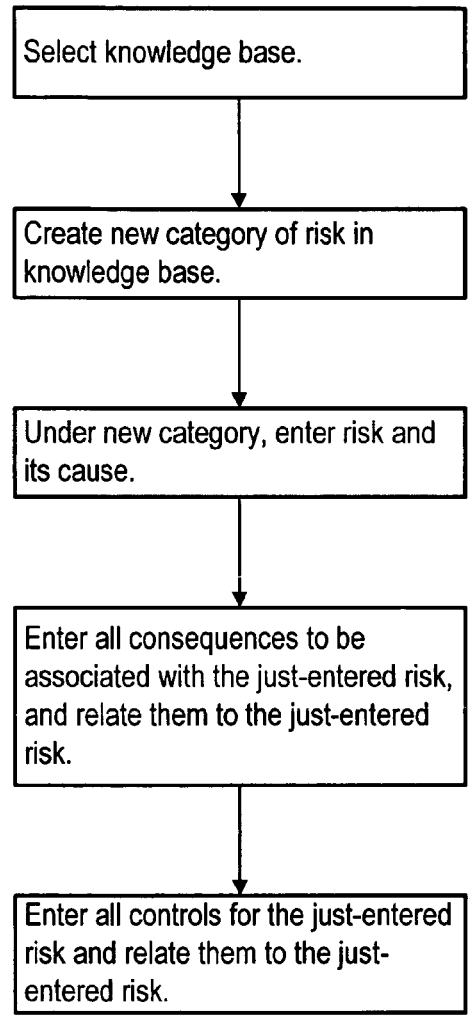
FIG. 6 is a flowchart indicating how a user of the invention is able to add to the knowledge base a generic risk record, i.e. a risk record not tied in the data stores of the invention to a particular context.

Referring now to FIG. 6, a scenario is indicated in which a user inputs into the knowledge base a new risk record. In this scenario, the user first selects the knowledge base and then creates a new category of risk in the knowledge base, a category of risk playing a role in the knowledge base similar to the role played by a context in the data store of profiles, i.e. serving merely to help logically organize the risks. In the preferred embodiment, the risk records in the knowledge base and contexts data store are stored in relational tables (as indicated in FIG. 1D). Thus, under the new category, the user would enter a value for the risk component fields and the cause field in the table for the risk and cause fields. Then the user would enter all consequences to be associated with the just entered risk in the table of consequences, being sure that the entered values are related to the just entered risk. Next, the user would enter all controls for the just entered risk into the table of controls, being sure to relate them to the just entered risk. The user in this scenario would then provide initial values for the measuring fields, values that may or may not be based on actual experience. The knowledge base would then update the measuring fields over time, as described below in connection with FIG. 7.

The categories, while useful in helping to organize the risks, are also helpful in understanding how the risks are used in the profiles of the different contexts. In the profiles area, when selecting which fields to view, such as the inherent likelihood field or the inherent consequence field, the user can select to view a knowledge base location field (not indicated or shown in FIG. 1B). The knowledge base location field indicates which category in the knowledge base a profile is stored, and the user can elect to have the invention display the description of a risk category provided in the knowledge base at the location indicated. Such a description is helpful to a user in understanding how the risk relates to the real world.

Figure 7:
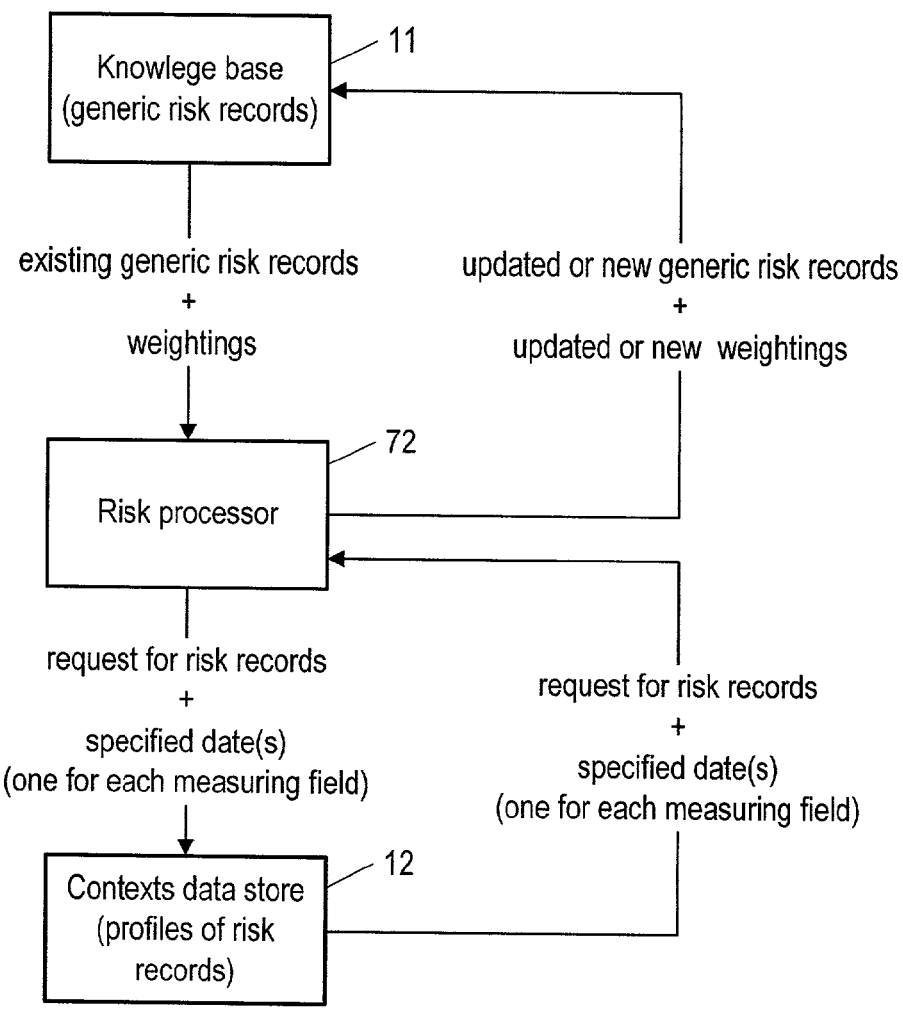
FIG. 7 is a block diagram/flow diagram of elements of the invention involved in updating the knowledge base, showing how the knowledge base learns over time.

Referring now to FIG. 7, in order that the knowledge base can learn over time, the invention includes, among other components, the knowledge base 11 of generic risk records already mentioned, a risk processor 72, and, also already mentioned, the data store 12 of contexts and ultimately of profiles, each profile including one or more risks, as explained above in connection with FIGS. 1A-D. The generic risk records include categories that are relevant to a particular context, source or area of operation, so that an organization can establish key risk areas associated with its operations and have oversight on how risk is dealt with in the key areas. A user commands the risk processor, from time to time, to update the measuring fields in the generic risk record stored in the knowledge base. The risk processor 72 is able to be commanded to update all measuring fields for a particular risk or all measuring fields of selected risks, including all risk in a particular category or all risks in various selected categories. For each risk for which the measuring fields are to be updated, the risk processor notes the date of the last update. The risk processor then extracts from the data store 12 of contexts all corresponding risk records with a date of last update that is later than the date of last update of the measuring fields of the generic risk record. (Each measuring field of each risk has its own date of last update.) In the preferred embodiment, each risk record has associated with it a reliability field that is used by the risk processor to determine whether to include the risk record in updating the knowledge base. In the preferred embodiment, a user provides a value for the reliability field that is simply either a zero, indicating that the measuring field values are not known to be reliable and should not be used to update the knowledge base, or a one, in which case the measuring field values will be used. The risk processor also obtains from the knowledge base a weighting value for each of the measuring fields. The weighting is essentially the number of measuring field values that have been incorporated into the current value of the measuring field in the knowledge base. Thus, for example, if 100 measuring field values have already been used to determine a value of a measuring field, and the risk processor pulls three new values of the same measuring field for the same risk from the data store 12 of contexts, then the existing value in the knowledge base 11 will be given a weight of 100, compared to an assumed weighting of 1 for each of the three values pulled from the data store of contexts.

Figure 8:
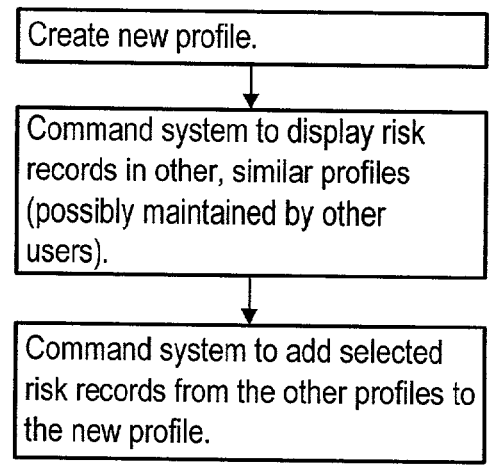
FIG. 8 is a flowchart indicating how a user of the invention is able to select from the knowledge base a generic risk record for use in a particular context.

Referring now to FIG. 8, a scenario is shown in which, instead of using generic risk records from the knowledge base, a user in creating a new profile uses as a starting point risk records in other, existing profiles, including profiles possibly maintained by other users. A user is able to command the system to display risk records in such other profiles, and then is able to command the system to replace one or more risk records or to create new risk records in the profile being developed by the user with the risk records from the other profiles. In the preferred implementation of the invention, a graphical user interface is used to show a window of the risks in the profile being created, and one or more additional windows, each additional window showing risks in another, existing profile. The user then simply drags a risk record (i.e. all of the related entries in the tables of the relational database indicated in FIG. 1D) from another, existing profile into the profile being created.

As explained above, in the preferred embodiment, the invention provides a graphical user interface in which information is presented to a user in one or more windows, such as the so called windows of the file manager application product WINDOWS EXPLORER provided by Microsoft Corporation as part of operating system MICROSOFT WINDOWS. The present invention, however, in the preferred embodiment, extends the use of windows compared to the use made by the file manager application WINDOWS EXPLORER of Microsoft Corporation. While the file manager application WINDOWS EXPLORER of Microsoft Corporation provides lists of data in columns in a window to the right of a selected item in a left hand window, the present invention allows a user to select multiple items in a left hand window and show the corresponding data for all of the selected items in the right hand window. For example, if the user selects several different profiles in a left hand window, the right hand window will show the values of the fields for each risk record in the selected profile as well as indicating the profile containing the risk records. In addition, the user is then able to interact directly with the values of the fields of the different risk records that are displayed in the right hand window, including editing the values of any such fields. Further, the invention allows a user to have the system display in the right hand window more than one list, each list possibly providing the data in more than one selected item (profile) in the left hand window.

Figure 9A:
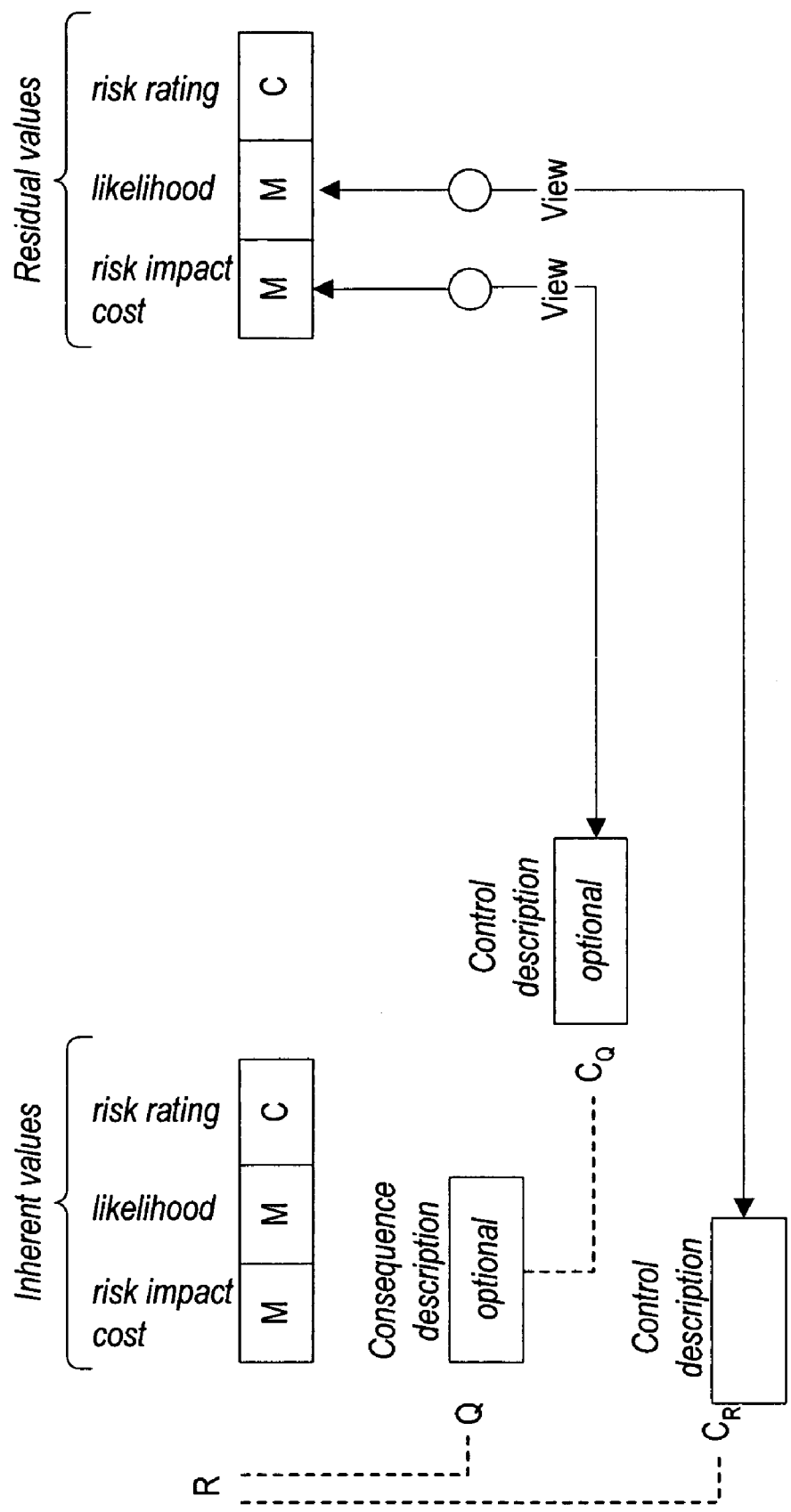
FIGS. 9A-9C are diagrams illustrating three stages of sophistication in the use of the invention.
Figure 9B:
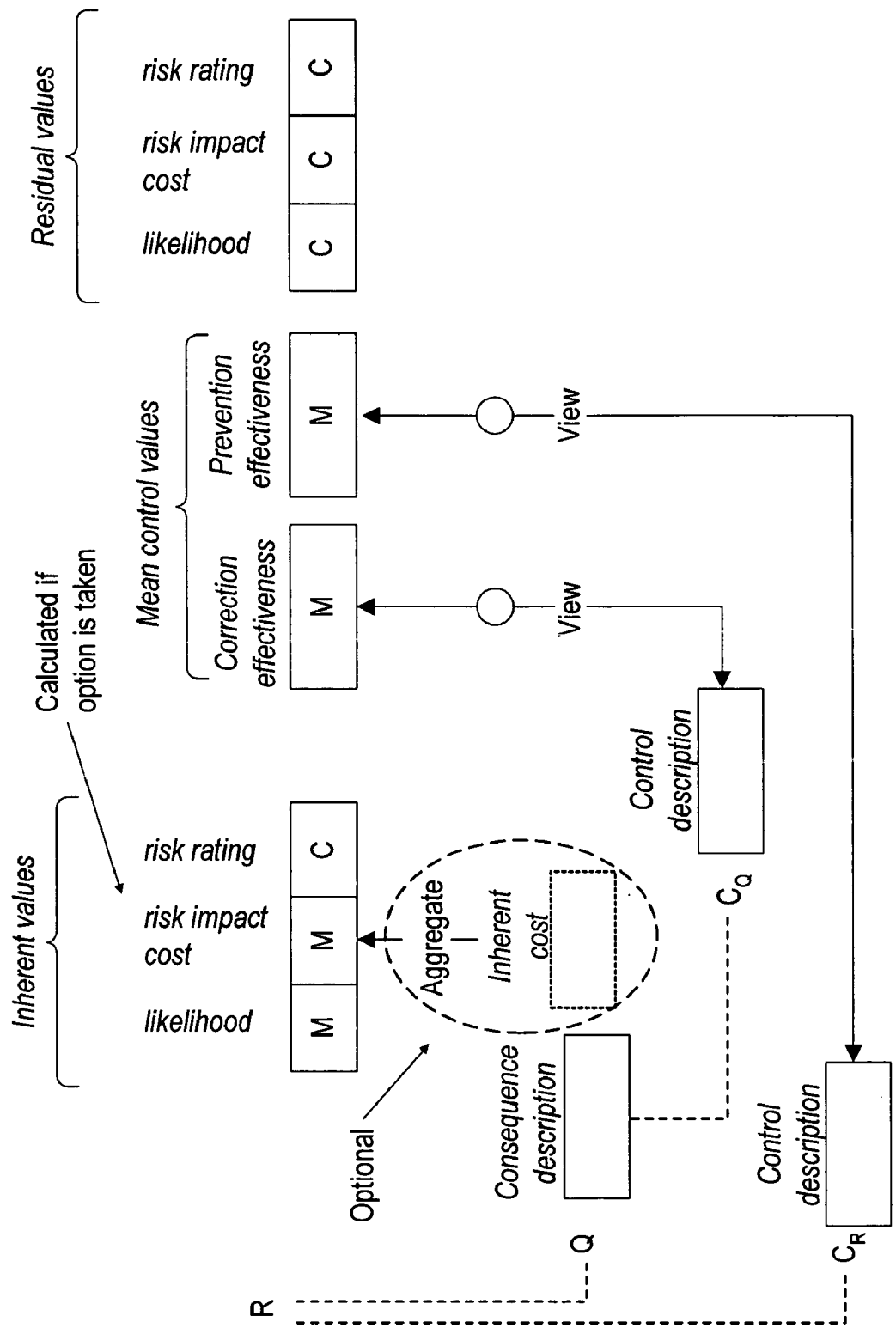
Figure 9C:
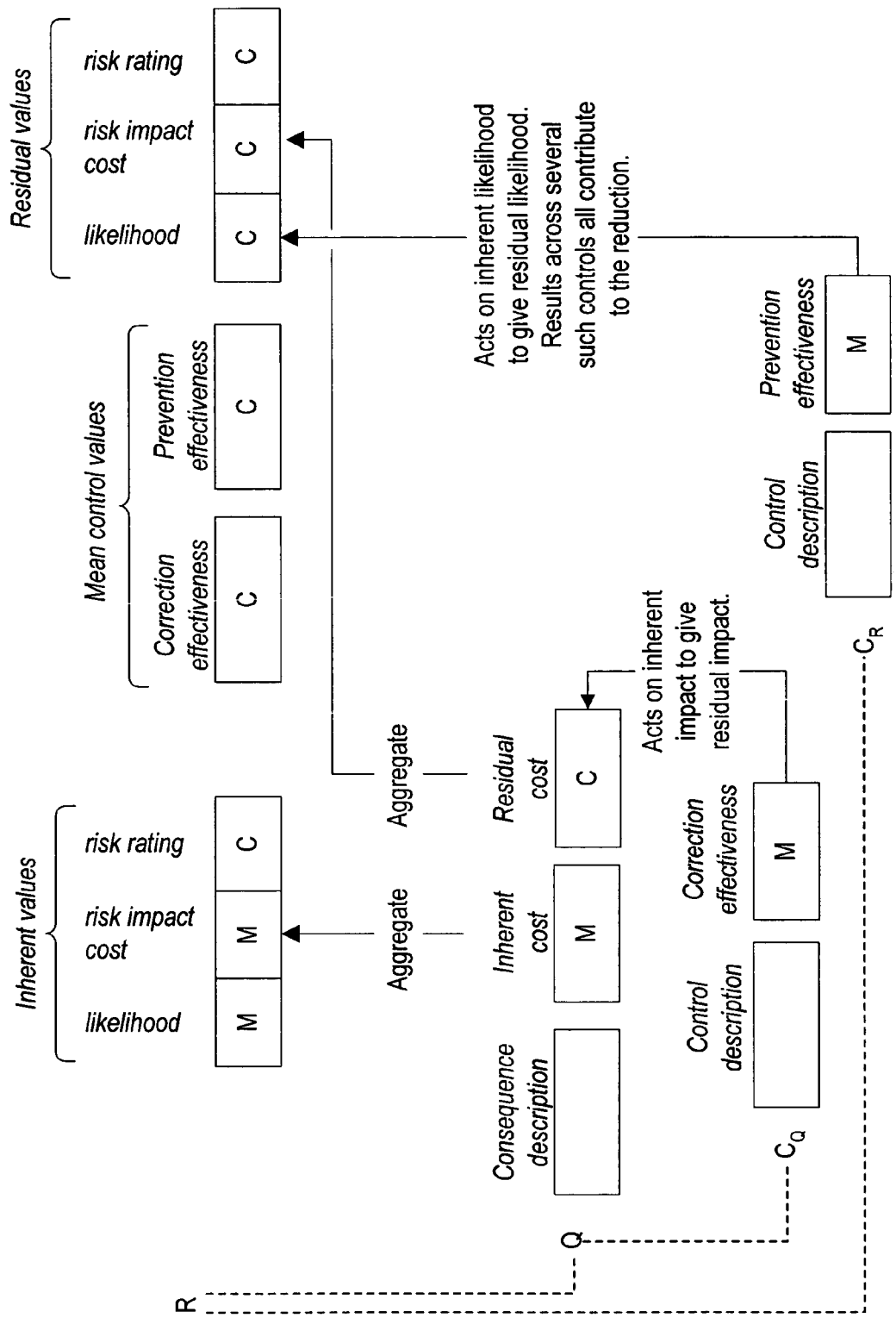

As mentioned above, the invention offers a mixture of use sophistication, or in other words, different modes of use (as opposed to modes of analysis, described above, including for example the controls self-assessment mode of analysis). Referring now to FIGS. 9A-9C, three increasingly sophisticated ways of using the invention are illustrated. Referring now in particular to FIG. 9A, the most straightforward use of the invention, i.e. the first stage of sophistication, is shown as a use in which four fields are manually assessed (i.e. values are provided for the fields by the user): the inherent likelihood and the inherent risk impact cost fields (from which the inherent risk rating is calculated by the invention), and the residual likelihood and the residual risk impact cost fields (from which the residual risk rating is calculated by the invention). (An "M" inside a data-item block indicates that the item is manually assessed, i.e. the field corresponding to the data is being treated as a measuring field instead of a calculated field. A "C" inside such a block indicates that the data item is calculated by the invention. The "R" in the diagram indicates risk, the "Q" represents consequence, and a subscripted "C" represents a control, subscripted with a "Q" to indicate either a preventive control, and so associated directly with the risk, or subscripted with a "R" to indicate a corrective control, and so associated directly with the consequence.) In this most straightforward use of the invention, there is no assessment of controls, or in other words, the effectiveness of each control is not entered expressly, but the effect of one or more controls is implicitly taken into account by the user entering the residual likelihood and residual consequence. Correspondingly, whether the user provides consequences at the consequence level is optional.

In viewing FIGS. 9A-9C, it is important to remember that there are, in principle, many different consequences for the same risk, each consequence having (in principle), many different corrective controls, and there are also many different preventive controls for the same risk. Thus, it is helpful in looking at FIGS. 9A-9C to imagine that there is a risk level (R), a consequence level (Q), a corrective control level ($C_Q$) and a preventive control level ($C_R$). As explained below, in more sophisticated uses of the invention, values at lower levels are sometimes aggregated to provide (either mean or total) values at higher levels, the risk level being the highest level shown in FIGS. 9A-9C. (Of course a given context has in principle many risks, so that it is also possible to refer to a context level and to aggregating values at the risk level up to the context level.)

Referring now to FIG. 9B, in the next stage of sophistication, four fields are again manually assessed, but not the same four as in the first stage. In the second stage, the inherent likelihood and the inherent risk impact cost fields (from which the inherent risk rating is calculated by the invention) are again provided, but now mean control values are provided (for both correction and prevention), from which the residual likelihood and the residual risk impact cost fields are calculated by the invention. The residual risk rating is then calculated by the invention based on its calculated values for the residual likelihood and the residual risk impact cost fields. In the second stage, there is another option: the user can either enter the inherent risk impact cost field manually (a value at the risk level), and thereby only implicitly take into account all of (i.e. the sum of) the individual consequences for the risk, or the user can enter an inherent cost for each consequence and then the invention aggregates (sums) the individual inherent cost values (at the consequence level) to obtain the inherent risk impact cost (at the risk level).

Referring now to FIG. 9C, in stage three, the user makes an assessment (manual input) of the effectiveness of the controls at both the preventive control level and the corrective control level, and the invention then calculates at the risk level the corresponding residual likelihood and residual risk impact cost (the invention finally calculating the residual risk rating based on the residual likelihood and residual risk impact cost values). The calculations for both the residual likelihood and residual risk impact cost are aggregate calculations, i.e. they adcount for the effect of all preventive and corrective controls for the risk. The invention also then calculates the mean control values as the difference between the inherent levels and residual levels at the risk level, i.e. based on the aggregate calculations. (The mean control values are therefore for information only; they are not used to determine the residual risk rating.)

The invention also includes a feature called methods and steps; it is a facility by which a user is able to script a risk analysis. The method of methods and steps indicates the name given to the script. Moreover, a script so specified can be general enough to apply to risk analyses in different profiles (including profiles in different contexts). For example, a user might wish to create an action plan based on a simple three-step analysis using only subjective measures for any of the measuring or calculated fields. A description of a corresponding script provided using the methods and steps facility of the invention is given in Table 3. (Steps 2 and 3 are repeated, iteratively, until the action plan reduces risk to acceptable levels, according to the residual assessment.) The methods and steps facility includes an interface by which the user specifies the details of the action associated with each step.

TABLE 3

Example of a method and steps script.

| Step Label | Step Name | Action |
| --- | --- | --- |
| Step 1 | Inherent assessment (i.e. make inherent assessment) | Show and allow input of risk description, inherent likelihood, inherent consequence, and inherent rating. Use subjective measures. |
| Step 2 | Action plan (i.e. make action plan) | Show all controls and allow engaging one or another of the controls. |
| Step 3 | Residual assessment (i.e. make residual assessment) | Show and allow input of preventive and corrective controls corresponding to the inherent likelihood and inherent consequence; calculate residual risk. Use subjective measures. |

It is to be understood that the above-described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. A system, comprising:
  a) a knowledge base, for maintaining a generic risk record including a plurality of fields at least some of which have subjective or quantitative values for risk, with the subjective values synchronized to numerical values, and at least some of which have been determined as an average of corresponding subjective or quantitative risk values in completed projects or processes;
  b) a data store of profiles, for maintaining a profile risk record associated with a particular profile for a particular project or process, and including the same plurality of fields as the generic risk record, the profile risk record for use in providing a risk assessment in the associated profile for the particular project or process; and
  c) a risk processor, for updating at least one of the subjective or quantitative values of the generic risk record based on a corresponding field value in the profile risk record in the data store of profiles, by averaging into the at least one value of the generic risk record the corresponding field value in the profile risk record;

whereby at least some of the subjective or quantitative values of the generic risk record are refined over time based on values of the corresponding fields of the profile risk record for the particular project or process;

wherein some of the subjective or quantitative values are values of measuring fields input by the user, and others are values of calculated fields calculated by the system, and the system allows different modes of analysis in which the fields that are the measuring fields differ;

wherein the modes of analysis include:

a residual assessment mode, in which a user selects inherent values of likelihood and consequence for a risk, and a value, for each control for the risk, for effectiveness in either preventing the risk or reducing the consequence of the risk, and the system then calculates residual levels of likelihood, consequence and risk rating for the risk;

an inherent assessment mode, in which a user selects residual values of likelihood and consequence for a risk, and a value, for each control for the risk, for effectiveness in either preventing the risk or in reducing the consequence of the risk, and the system then calculates the inherent levels of likelihood, consequence and risk rating for the risk; and a controls self-assessment mode, in which a user selects inherent values of likelihood and consequence for a risk, as well as residual values of likelihood and consequence for the risk, and the system then calculates the effectiveness of predetermined controls needed to either prevent the risk or to reduce the consequence of the risk.

2. The system of claim 1, wherein the system can be used in different modes of use, and further wherein only some of the fields of the generic risk record or the profile risk record are required to be used in a risk management analysis, and which of the fields are required depends on the mode of use.

3. The system of claim 2, wherein both the generic risk record and the profile risk record each comprise:

a) a risk component, for indicating a risk, for indicating an inherent risk rating, and also for indicating a residual risk rating;

b) a cause component, for indicating the cause of the risk;

c) a consequence component, for indicating a particular consequence of the risk and an inherent and a residual cost of the particular consequence; and d) a control component, for indicating a control, for indicating whether the control is corrective or preventive, and for indicating the effectiveness of the control.

4. The system of claim 3, wherein in one mode of use an inherent risk impact cost is aggregated over the inherent cost of each consequence of the risk.

5. The system of claim 3, wherein in one mode of use the residual likelihood is an aggregate calculation based on the effectiveness of each preventive control acting on an inherent likelihood.

6. The system of claim 3, wherein in one mode of use a residual risk impact cost is aggregated over the residual cost of each consequence of the risk.

7. The system of claim 1, further comprising a scripting facility for enabling a user to create a script directing how a risk management process is to be performed, the script indicating steps that can be used in performing risk analysis in any profile.

8. The system of claim 1, further wherein the risk processor also uses the generic risk record to provide initial values for the profile risk record, whereby the profile risk record has initial values based on experience gained over time.

9. A method, comprising:

a) a step of maintaining in a knowledge base a generic risk record including a plurality of fields at least some of which have subjective or quantitative values for risk, with the subjective values synchronized to numerical values, and at least some of which have been determined as an average of corresponding subjective or quantitative risk values in completed projects or processes;

b) a step of maintaining in a data store of profiles a profile risk record associated with a particular profile for a particular project or process, and including the same plurality of fields as the generic risk record, the profile risk record for use in providing a risk assessment in the associated profile for the particular project or process; and c) a step of updating at least one of the subjective or quantitative values of the generic risk record based on a corresponding field value in the profile risk record in the data store of profiles, by averaging into the at least one value of the generic risk record the corresponding field value in the profile risk record;

whereby at least some of the subjective or quantitative values of the generic risk record are refined over time based on values of the corresponding fields of the profile risk record for the particular project or process;

wherein some of the subjective or quantitative values are values of measuring fields input by the user, and others are values of calculated fields calculated by the system, and the method allows different modes of analysis in which the fields that are the measuring fields differ;

wherein the modes of analysis include:

a residual assessment mode, in which a user selects inherent values of likelihood and consequence for a risk, and a value, for each control for the risk, for effectiveness in either preventing the risk or reducing the consequence of the risk, and the method then calculates residual levels of likelihood, consequence and risk rating for the risk;

an inherent assessment mode, in which a user selects residual values of likelihood and consequence for a risk, and a value, for each control for the risk, for effectiveness in either preventing the risk or in reducing the consequence of the risk, and the method then calculates the inherent levels of likelihood, consequence and risk rating for the risk; and a controls self-assessment mode, in which a user selects inherent values of likelihood and consequence for a risk, as well as residual values of likelihood and consequence for the risk, and the method then calculates the effectiveness of predetermined controls needed to either prevent the risk or to reduce the consequence of the risk.

10. The method of claim 9, wherein the method can be used in different modes of use, and further wherein only some of the fields of the generic risk record or the profile risk record are required to be used in a risk management analysis, and which of the fields are required depends on the mode of use.

11. The method of claim 10, wherein both the generic risk record and the profile risk record each comprise:

a) a risk component, for indicating a risk, for indicating an inherent risk rating, and also for indicating a residual risk rating;
b) a cause component, for indicating the cause of the risk;
c) a consequence component, for indicating a particular consequence of the risk and an inherent and a residual cost of the particular consequence; and
d) a control component, for indicating a control, for indicating whether the control is corrective or preventive, and for indicating the effectiveness of the control.

12. The method of claim 11, wherein in one mode of use an inherent risk impact cost is aggregated over the inherent cost of each consequence of the risk.

13. The method of claim 11, wherein in one mode of use the residual likelihood is an aggregate calculation based on the effectiveness of each preventive control acting on an inherent likelihood.

14. The method of claim 11, wherein in one mode of use a residual risk impact cost is aggregated over the residual cost of each consequence of the risk.

15. The method of claim 9, further comprising a step of using a scripting facility to enable a user to create a script directing how a risk management process is to be performed, the script indicating steps that can be used in performing risk analysis in any profile.

16. The method of claim 9, further wherein the risk processor also uses the generic risk record to provide initial values for the profile risk record, whereby the profile risk record has initial values based on experience gained over time.

* * * * *

UNITED STATES PATENT AND TRADEMARK OFFICE
CERTIFICATE OF CORRECTION

PATENT NO. : 7,319,971 B2
APPLICATION NO. : 09/774538
DATED : January 15, 2008
INVENTOR(S) : Ian E. Abrahams et al.

It is certified that error appears in the above-identified patent and that said Letters Patent is hereby corrected as shown below:

Column 12, line 7, "the" should be --be--.

Column 14, line 29, "file manager application" should be deleted.

Column 14, line 34, "the file manager application" should be deleted.

Column 14, lines 35 and 36, "of Microsoft Corporation" and "the file manager application" should be deleted.

Column 14, lines 36 & 37, "of Microsoft Corporation" should be deleted.

Column 15, line 63, "adcount" should be --account--.

Signed and Sealed this

Third Day of June, 2008

JON W. DUDAS
*Director of the United States Patent and Trademark Office*